United States Patent
Smith et al.

(10) Patent No.: US 11,728,690 B2
(45) Date of Patent: Aug. 15, 2023

(54) FOREIGN OBJECT DETECTION USING WIRELESS POWER RECEIVER'S RESPONSE TO MODIFIED TRANSMITTER BEHAVIOR

(71) Applicant: Renesas Electronics America Inc., Milpitas, CA (US)

(72) Inventors: Nicholaus Smith, La Mesa, CA (US); Gustavo Mehas, Mercer Island, WA (US); Tao Qi, San Diego, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 3 days.

(21) Appl. No.: 16/915,940

(22) Filed: Jun. 29, 2020

(65) Prior Publication Data

US 2021/0408836 A1    Dec. 30, 2021

(51) Int. Cl.
*H02J 50/60* (2016.01)
*H02J 50/12* (2016.01)
*H02J 50/90* (2016.01)
*H02J 50/80* (2016.01)

(52) U.S. Cl.
CPC ........... *H02J 50/60* (2016.02); *H02J 50/12* (2016.02); *H02J 50/80* (2016.02); *H02J 50/90* (2016.02)

(58) Field of Classification Search
None
See application file for complete search history.

(56) References Cited

U.S. PATENT DOCUMENTS

| | | | |
|---|---|---|---|
| 9,450,648 B2 | 9/2016 | Bastami | |
| 9,551,805 B2 | 1/2017 | Singh | |
| 9,553,485 B2 | 1/2017 | Singh et al. | |
| 9,948,112 B2 | 4/2018 | Hao et al. | |
| 10,079,508 B2 | 9/2018 | Mehas et al. | |
| 10,132,650 B2 | 11/2018 | Mehas et al. | |
| 10,601,256 B2 | 3/2020 | Bakker et al. | |
| 2010/0013320 A1* | 1/2010 | Shiozaki | H02J 7/00034 307/104 |
| 2013/0257168 A1* | 10/2013 | Singh | H02J 50/60 307/104 |
| 2013/0285620 A1* | 10/2013 | Yamamoto | H02J 50/60 320/155 |
| 2015/0115735 A1 | 4/2015 | Singh et al. | |

(Continued)

FOREIGN PATENT DOCUMENTS

WO    2017121672 A1    7/2017

OTHER PUBLICATIONS

Cortes et al., "Lateral Position Error Reduction using Misalignment-Sensing Coils in Inductive Power Transfer Systems," IEEE/ASME Transactions on Mechatronics, vol. 23, No. 2, Apr. 2018.

(Continued)

*Primary Examiner* — Rexford N Barnie
*Assistant Examiner* — Terrence R Willoughby
(74) *Attorney, Agent, or Firm* — Haynes and Boone, LLP (57) ABSTRACT

A wireless power transmitter pulses the transmit power level unresponsively to the wireless power receiver's power requests in order to perform foreign object detection (FOD). The FOD is performed by the transmitter analyzing the receiver's responses to the pulsed power. Some embodiments avoid mistaking FOD for coil misalignment. Other features are also provided.

20 Claims, 3 Drawing Sheets

(56) References Cited

U.S. PATENT DOCUMENTS

| | | | |
|---|---|---|---|
| 2015/0349542 A1* | 12/2015 | Yamamoto | H02J 50/40 |
| | | | 307/104 |
| 2016/0046194 A1* | 2/2016 | Tsukamoto | H02J 50/60 |
| | | | 307/104 |
| 2016/0087690 A1* | 3/2016 | Tsukamoto | H02J 50/10 |
| | | | 307/104 |
| 2018/0026482 A1* | 1/2018 | Asano | H02J 7/00 |
| | | | 307/104 |
| 2018/0337559 A1 | 11/2018 | Smith et al. | |
| 2019/0068001 A1* | 2/2019 | Lovas | H02J 50/80 |
| 2019/0140489 A1 | 5/2019 | Liu et al. | |
| 2019/0204369 A1 | 7/2019 | Lafontaine et al. | |
| 2019/0260241 A1 | 8/2019 | Park | |

OTHER PUBLICATIONS

U.S. Appl. No. 16/378,273, filed Apr. 8, 2019.
Xia et al., "Foreign Object Detection for Electric Vehicle Wireless Charging," Electronics, 9, 805, pp. 1-26, 2020.
Zhang et al., "A Review of Foreign Object Detection (FOD) for Inductive Power Transfer Systems," https://doi.org/10.1016/j.etran.2019.04.002, eTransportation 1, 100002, pp. 1-10, 2019.

* cited by examiner

FOREIGN OBJECT DETECTION USING WIRELESS POWER RECEIVER'S RESPONSE TO MODIFIED TRANSMITTER BEHAVIOR

TECHNICAL FIELD

Embodiments of the present invention relate to wireless power systems and, specifically, to foreign object detection.

DISCUSSION OF RELATED ART

Mobile devices, for example smart phones, tablets, wearables and other devices are increasingly using wireless power charging such as accomplished by wireless power transfer (WPT). Wireless power transfer may involve a transmitter driving a transmit coil to produce a time-varying magnetic field, and a receiver with a receive coil placed proximate to the transmit coil. The receiver coil receives the wireless power generated by the transmit coil and uses that received power to drive a load, for example to charge a battery. The receive coil and the load can be part of a device such as a cell phone, PDA (personal digital assistant), computer, electric or hybrid vehicle, or other device.

The power transfer can be disrupted by an electrically conductive (e.g. metallic) foreign object—such as a coin, a key, a paper clip, a screw, a tinfoil, etc.—located proximate to the transmit and receive coils to absorb a significant part of the transmitted magnetic energy and thus reduce the energy available to the load. Also, undesirably, the foreign object (FO) can be heated by the absorbed energy, creating fire or other hazards.

A FO can be detected by monitoring the WPT parameters such as, for example, the transmitted power or the coil coupling coefficient. If a FO is detected (e.g. by detecting a loss of transmitted power), the transmitter may stop or slow down the power transfer, and/or generate an alarm. See Yiming Zhang et al., *A review of foreign object detection (FOD) for inductive power transfer systems*, https://doi.org/10.1016/j.etran.2019.04.002, eTransportation (Elsevier B. V., 2019), incorporated herein by reference. But such FO detection (FOD) is not always reliable because similar WPT parameters (e.g. transmitter power loss) are produced by misalignment of the transmit and receive coils relative to each other. Therefore, the FOD operation may result in the power transfer being unnecessarily slowed down or stopped due to coil misalignment mistaken for a FO when no FO is present. Improved FOD is needed.

SUMMARY

Some embodiments of the present invention provide FOD techniques that are less likely to mistake coil misalignment for FO presence. In some embodiments, a separate method (possibly a conventional method, such as using sensing coils) detects coil misalignment. Further, the transmitter is calibrated by changing the transmitted power and measuring the receiver response to the change at different coil alignment conditions. The receiver responses are recorded in the transmitter memory for different alignment conditions. During WPT, the transmitter senses the coil alignment condition, changes the transmitted power in the same way as was done during calibration for the same or similar coil alignment condition, and if the receiver response does not match the calibrated response then FO presence may be signaled.

Some embodiments operate without detecting the coil alignment condition. Calibration is performed during WPT, e.g. at the start of WPT, assuming no FO is present at that time. In calibration, the transmitter changes the transmitted power and records the receiver response. After the calibration phase, the transmitter periodically changes the transmitted power. If the receiver response does not match the recorded response, this may be due to FO appearing after calibration, and FO presence may be signaled.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
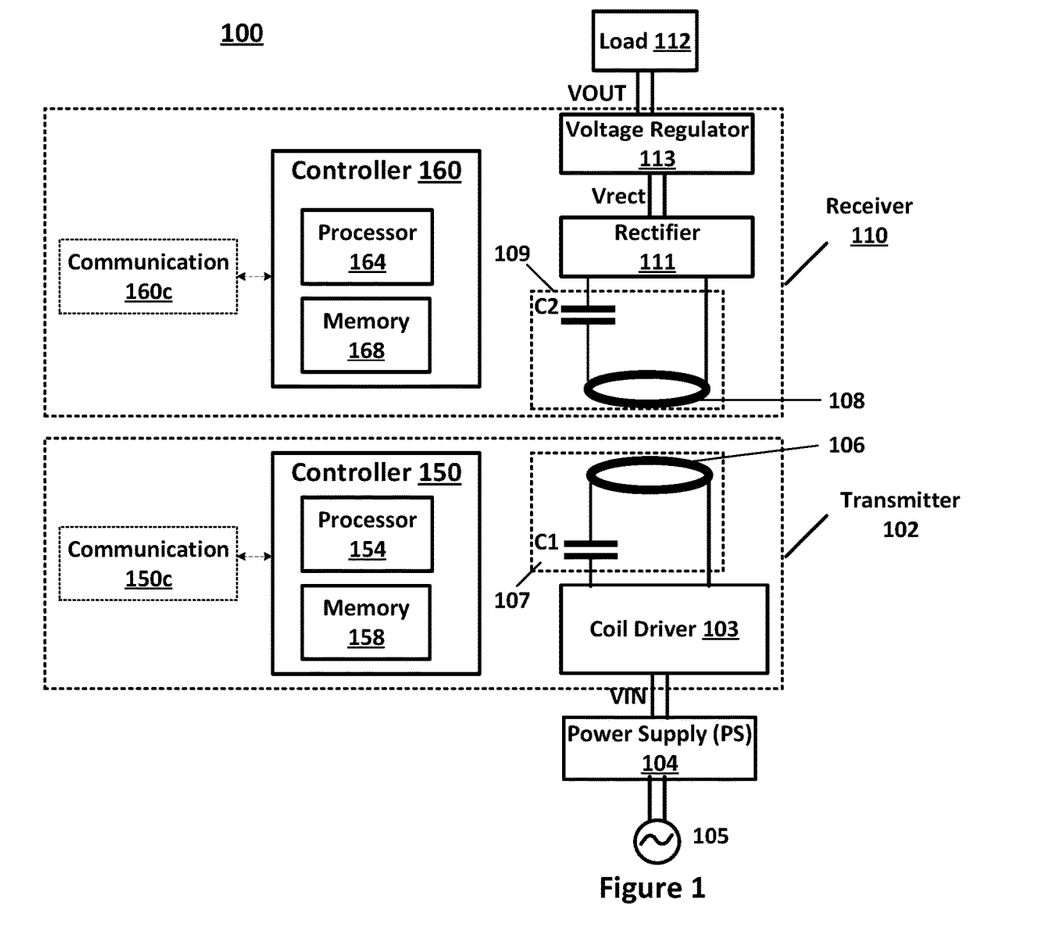
FIG. 1 illustrates a wireless power transfer system.

FIG. 1 illustrates a WPT system 100. Wireless power transmitter 102 includes a coil driver 103 driving transmit coil 106 with alternating current to generate a time-varying magnetic field. Coil driver 103 may be a bridge inverter or some other type, powered by DC voltage VIN from power supply 104. Power supply 104 may be, for example, a battery based supply, or may receive power from alternating current source 105. Coil 106 is part of a resonant tank 107 also including a capacitor C1 and possibly other capacitor and/or non-capacitor components.

The magnetic field (B-field) produced by coil 106 induces a current in receive coil 108, which is part of a resonant tank 109 including also a capacitor C2 and/or other components. Rectifier 111 rectifies the receive coil current and provides a rectified voltage Vrect to voltage regulator 113, which generates from Vrect a DC voltage VOUT for load 112. Load 112 includes a battery and/or other components of a mobile device. See for example the following patent documents incorporated by reference herein: U.S. patent publications no. US 2019/0140489, published May 9, 2019 (inventors: Rui Liu et al.); no. US 2018/0337559, published May 22, 2018 (inventors: Smith et al.); no. US 2015/0115735, published Apr. 30, 2015 (inventors: Singh et al.); US 2019/0204369, published Jul. 4, 2014 (inventor: Lafontaine et al.); U.S. Pat. No. 10,601,256, issued Mar. 24, 2020 (inventors: Bakker et al.); U.S. patent application Ser. No. 16/378,273, filed Apr. 8, 2019; and international patent publication no. WO 2017/121672, published Jul. 20, 2017 (inventors: Staring et al.).

Transmitter operation is controlled by controller 150, possibly including a computer processor 154 executing computer instructions stored in memory 158, and possibly including other components. Receiver operation is controlled by controller 160, possibly including a computer processor 164 executing computer instructions stored in memory 168, and possibly including other components. Transmitter controller 150 and receiver controller 160 can implement communication functions shown schematically as blocks 150c, 160c, to cause the Tx 102 and Rx 110 to wirelessly communicate with each other via coils 106 and 108, as known in the art.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium (WPC), the Qi specification, a resonant inductive coupling system is utilized to charge a single device at the resonance frequency of the device. In the Qi standard, coil 108 is placed in close proximity (e.g. 40 mm or less for near-field power transfer) with coil 106 while in the A4WP standard, coil 108 is placed near coil 106 along with other coils that belong to other charging devices.

The WPT operation will be explained on an example of inductive, near-field power transfer, possibly operating according to the Qi specification, but the invention is not limited to such examples.

In near-field power transfer, e.g. when the distance between the coils 106, 108 is comparable to the coil diameter or smaller than the coil diameter, the power transfer efficiency is highly sensitive to coil misalignment. In FIG. 1, the coils are perfectly aligned, i.e. coaxial. The receive coil 108 can be of the same, smaller, or larger diameter than transmit coil 106.

Due to sensitivity to coil misalignment, it may be difficult to determine whether any power transfer inefficiencies are due to coil misalignment or FO presence. For example, one FOD technique is to compare the Reported Rx Power measured by Rx 110 to transmitter power measured by Tx 102. If operating under the Qi standard, the Reported Rx Power is measured by Rx 110 as the power at the output Vrect or VOUT, and is reported to Tx 102 in a Received Power Packet (RPP). Transmitter power (Tx_PWR) is measured by Tx 102 as the power of signal VIN. If Tx_PWR exceeds RPP by more than a threshold amount, the system treats this power loss, equal to Tx_PWR−RPP, as indicative of FO presence, and terminates the power transfer. But FO presence and misalignment may both result in the same power loss. Therefore, while this FOD technique helps to ensure safe power transfer, this technique reduces the system tolerance to coil misalignment, and hence reduces the WPT active area, i.e. the area that can be occupied by Rx coil 108 for a given position of Tx coil 106.

Similar problems exist with FOD techniques using the Tx and Rx coil quality factors measured by Tx 102 (QF_Tx) and Rx 110 (QF_Rx, reported to Tx 102). The quality factors are measured before power transfer begins. FOD is performed by matching the reported QF_Rx against the measured QF_Tx: if there is a match, then it is assumed that there is no FO present.

For a given Rx output power (as indicated by RPP), the time derivative of the magnetic flux that crosses Rx coil 108 should be constant (i.e. the rms value should be constant). A change in the magnetic flux derivative will have a proportional change in rectified voltage Vrect and delivered power (RPP). So when FO is present or the coils are misaligned, Tx 102 increases the magnetic field (B-field) in Tx coil 106 to compensate for the power loss, such that the time derivative of the magnetic flux crossing the Rx coil remains the same to keep the output power constant at the VOUT terminal. The FO presence and the coil misalignment both reduce the B-field density in Rx coil 108 due to physics behavior of time varying magnetic fields. Both conditions require stronger Tx coil 106 B-field to compensate for the power loss.

Figure 2A:
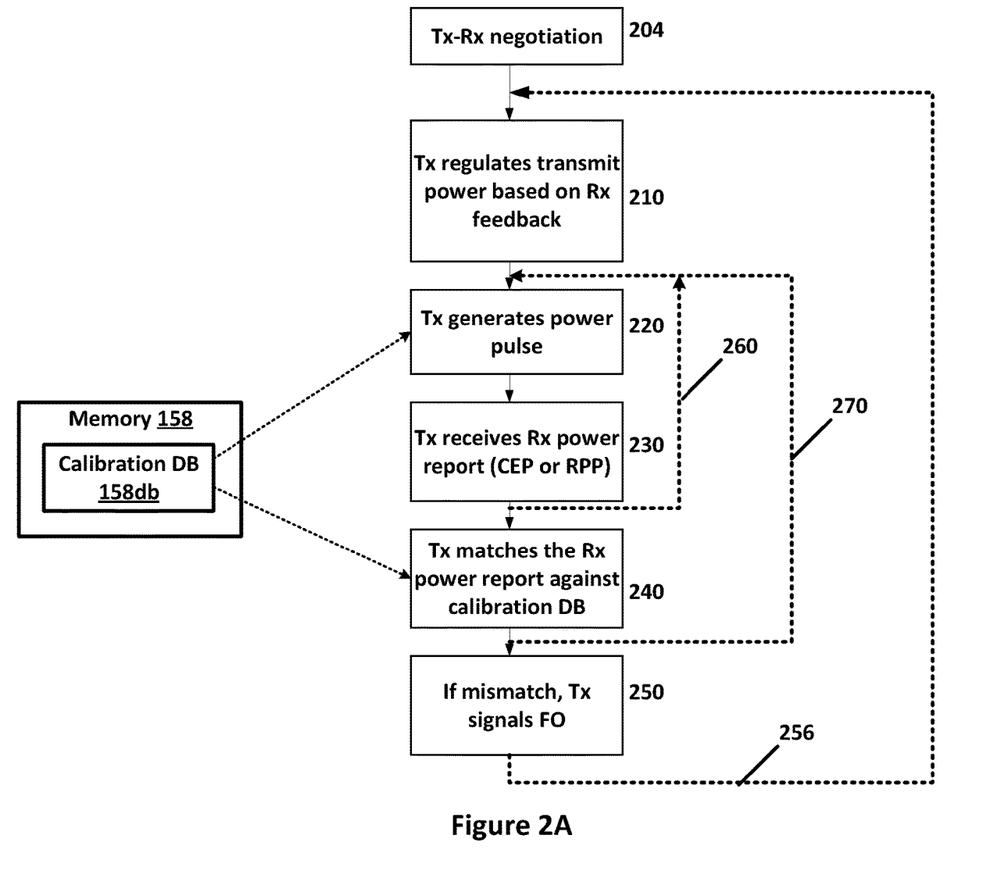
FIGS. 2A and 2B illustrates foreign object detection processes.
Figure 2B:
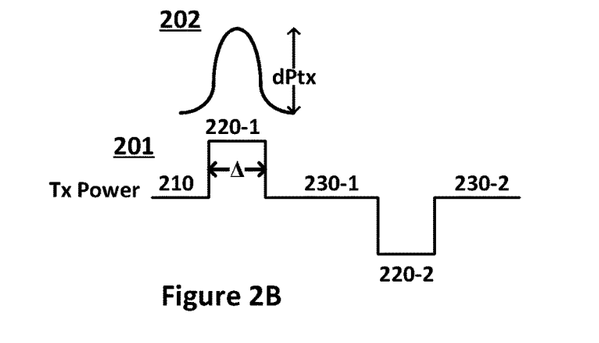

Some embodiments of the present invention focus on the receiver response to a change of the magnetic field (B-field) generated by Tx 102 during the power transfer to determine, based on calibration performed for a given coil alignment (or misalignment), whether the change reported by the Rx 110 matches the B-field change. A mismatch is considered to be an indication of FO presence. The FOD process assumes that the coil alignment during the power transfer is the same as during calibration. FIG. 2A illustrates such FOD process, and FIG. 2B shows the corresponding waveforms generated by Tx 102. Waveform 201 is a digital signal generated by controller 150. Waveform 202 is the corresponding power rms transmitted by Tx coil 106.

Before the WPT, at step 204, conventional negotiation is performed by Tx 102 and Rx 110 to exchange their identifications and negotiate WPT parameters (e.g. initial charging power level).

At step 210, the power transfer proceeds as normal, with Tx 102 adjusting the transmitted power based on Rx 110 feedback messages. For example, under Qi standard, the Rx feedback includes Control Error Packets (CEPs) and Received Power Packets (RPPs). A CEP contains a signed integer value c representing a request to set the primary coil 106 current amplitude at the following level $t_{new}$:

$$t_{new} = t_{present}(1 + c/128) \qquad (1)$$

where $t_{present}$ is the present current in Tx coil 106. The factor c (also denoted simply as "CEP" below) represents the relative increase (or decrease if CEP is negative) in the current, power, and magnetic field in coil 106. If CEP=0, the request is to keep the current unchanged. The power and magnetic field will also be unchanged if the operating frequency remains unchanged. The CEP value is an integer in the range −128 . . . +127. A CEP packet is transmitted about every 250 ms.

The Qi standard also requires Rx 110 to send a Received Power Packet (RPP) about every 1500 ms. The RPP carries an average received power value over a time window specified by the Qi protocol.

At step 210, Tx 102 adjusts the transmitted power per the CEP and/or RPP requests (also called reports) or other types of requests if not operating under the Qi standard.

At step 220, Tx 102 begins a FOD test, in which Tx 102 changes the coil 106 current amplitude and/or frequency non-responsively to the Rx 110 power reports. In some embodiments, the FOD test is performed at regular periods of time, e.g. every 30 seconds. In some embodiments, each FOD test starts when the Rx 110 power reports indicate stable operation, e.g. CEP=0. In other embodiments, a FOD test can start when CEP has a non-zero magnitude below a predefine threshold. For example, each FOD test may start at the end of a regular period of time as soon as the CEP magnitude is zero or below the threshold.

At step 220, Tx 102 continues transmitting power but temporarily increases or decreases the current amplitude or frequency in Tx coil 106 to generate, respectively, a positive or negative B-field pulse. In the example of FIG. 2B, a positive pulse is shown at 220-1, and a subsequent negative pulse is shown at 220-2. Each pulse 220 can be generated by changing the Tx operating frequency, e.g. moving the frequency towards the resonant frequency of Tx resonant tank 107 to generate a positive pulse (such as 220-1), or away from the resonant frequency to generate a negative pulse (such as 220-2). In some embodiments, the operating frequency is kept above the resonant frequency throughout WPT, so the frequency is decreased to generate a positive pulse, and increased for a negative pulse. (The Qi standard, for example, allow the operating frequency to vary from 87 kHz to 205 kHz.)

Alternatively, the pulses 220 can be generated by increasing (for a positive pulse) or decreasing (for a negative pulse) the voltage VIN or a bridge voltage VBRG (not shown, generated from VIN to drive the coil driver 103 of bridge inverter type), to change the amplitude of the current in transmit coil 106, possibly without frequency changes.

The pulse width Δ, and the power pulse amplitude dPtx, are the same as were used in calibration. (Calibration is described below.) The pulse widths and amplitudes can be pre-stored in calibration database 158*db* in Tx memory 158. For example, the pulse amplitudes dPtx can be stored as relative values, relative to the transmit power Ptx immediately before the pulse. Different pulse widths and amplitudes can be used in different FOD tests. In some Qi examples, the pulse width Δ is at least 10 ms, and the pulse amplitude dPtx is 10% (e.g. 1 W for a 10 W transmit power Ptx before the pulse). The pulse width Δ should be long enough to allow the Rx 110 to settle and calculate the new CEP or RPP value. In one example, at step 210, Tx 102 measures the CEP interval (the interval between the successive CEPs), and at step 220 waits for a CEP and then measures one half of the CEP interval to start the pulse 220. In other words, the pulse 220 begins in the middle between successive CEPs. For example, if the measured CEP interval is 50 ms, pulse 220 begins 25 ms after a CEP receipt. Then the next CEP will request power change that counters the pulse 220 power. The power pulse 220 may be any duration of at least 10 ms up to the CEP standard or accelerated interval (typically 50 ms). The same rule can be used if using the RPP to determine the magnetic field strength being received by the Rx.

At step 230 (230-1 or 230-2 in FIG. 2B), Tx 102 returns the output power Ptx to its value right before the pulse 220, and waits for Rx 110 to respond. Step 230 can be 250 ms long in Qi embodiments.

Whether or not Rx 110 detects the Vrect or VOUT power change in response to pulse 220, Rx 110 will inform Tx 102 (e.g. via regular CEP and/or RPP communications) of the requested Tx power. If pulse 220 was positive, the likely communication will be to decrease the power level to bring it back to where it was immediately before the pulse. On a negative pulse 220, the likely communication will be to increase the power level to where it was immediately before the pulse. If these requested levels do not match the values in DB 158*db*, which Tx 102 checks at step 240, the mismatch is likely due to FO presence, and Tx 102 will generate a FO detection signal at step 250 to take an appropriate action, e.g. generate a visual and/or audio alarm and/or reduce the Tx coil 106 power and/or terminate the power transfer.

DB 158*db* stores calibration data as absolute and/or relative values. For example, in some embodiments, each entry in DB 158*db* includes the following data:

$$<dPtx, dPrx>\qquad(2)$$

where dPtx is a relative change of the transmitted power Ptx in pulse 220, and dPrx is the expected requested relative change of the transmitted power at step 230 (e.g. as represented by the CEP value in Qi embodiments). In some embodiments, both values (2) are stored as positive values, and are used with opposite signs in step 240: if a positive pulse +dPtx is generated at step 220, then the negative value −dPrx is used at step 240. If a negative pulse −dPtx is generated at step 220, the positive +dPrx is used at step 240. In other embodiments, the stored values (2) may be signed values, allowing asymmetric calibration data, i.e. different dPrx values for dPtx values having the same magnitude but opposite signs.

A match at step 240 may mean the exact match (equality) between the actual Rx power request and dPrx (i.e. +dPrx or −dPrx as explained above), or may mean an approximate match, i.e. that the Rx power request is within a predefined interval defined by dPrx. Other match relationships are also possible. Of note, if FO is present then the transmitted power will likely be higher at step 210 to compensate for the power absorbed by FO. Also, the AC currents will be higher in amplitude, and the CEP value will be lower in magnitude. In some embodiments, the match at step 240 means the following:

$$|CEP| \ge |dPrx|; \text{ and}$$

CEP is negative for a positive pulse 220, and positive for a negative pulse 220.

In case of a match at step 250, the power transfer continues as normal per arrow 256, returning to step 210.

In the embodiment above, each FOD test involves only one pulse 220. In other embodiments, as indicated by arrow 260, the steps 220 and 230 are repeated a number of times in the same FOD test, possibly with the same kind of pulse, e.g. all positive or all negative with the same (Δ, dPtx) parameters. At step 240, Tx 102 may average the Rx power values received at steps 230, and may match the average Rx power against dPrx. The FOD test is otherwise the same as for a single pulse.

As indicated by arrow 270, Tx 102 may repeat the steps 220, 230, 240 a number of times, keeping the record of the number of successful matches at step 240. An iteration 270 may involve only one pulse 220 (no iterations 260) or more than one pulse 220. At step 250, if the number of successful matches is below a certain percentage of the total number of steps 240, e.g. 60%, then FO presence is signaled at step 250. Otherwise, FO absence is signaled.

In some embodiments, if any iteration 270 involves a mismatch at step 240, then step 250 is performed, and the FOD test terminates.

An FOD test may use different pulse parameters—Δ, dPtx, and the pulse sign (positive or negative)—in different iterations 260 and/or 270. For example, in some embodiments using iterations 270 with just one pulse (no iterations 260), the positive and negative pulses alternate as in FIG. 2B.

Calibration

Figure 3:
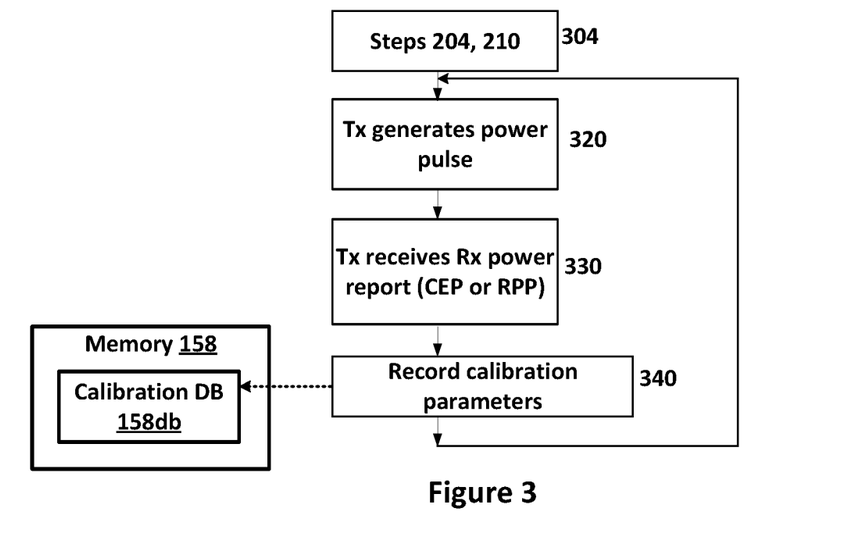
FIGS. 3 and 4 illustrate calibration processes for foreign object detection.

FIG. 3 illustrates a calibration process performed at the start of WPT before the FOD tests in some embodiments.

The calibration can be performed after steps 204 and 210 (FIG. 2A), which are shown at 304 in FIG. 3.

Steps 320, 330 are similar to respective FOD steps 220, 230 of FIG. 2A: Tx 102 generates a pulse 220 at step 320, and waits for the Rx response at step 330. The pulse parameters, such as duration Δ, amplitude dPtx, the sign, and may be others, are obtained from memory 158 or some other source. Iterations 260 may or may not be generated as in FIG. 2A. The pulse amplitude is used to provide the dPtx value for DB 158db, and the Rx requested power at step 330 is used to provide the corresponding dPrx value. These values are written to DB 158db to form an entry (2), which is written to DB 158db at step 340. In some embodiments, multiple calibration steps are performed with the same dPtx value, and the dPrx value is calculated as the average of the Rx values received at step 330.

Steps 320-340 are repeated as needed to build calibration DB 158db.

Then WPT continues as per FIG. 2A starting with step 210. In some embodiments, DB 158db is updated at steps 240: if the requested power matches, but is not equal to, the dPrx value in DB 158db (i.e. the requested power is within a predefined interval of the dPrx value), the dPrx value is changed to a weighted average of the dPrx value and the requested value.

Since the calibration of FIG. 3 is performed at the start of each WPT operation, DB 158db can be stored in either volatile or non-volatile part of memory 158, and can be deleted after the WPT operation. In some embodiments, DB 158db is not deleted, and is possibly stored in non-volatile memory for future use with the same Rx 110. In particular, during calibration (FIG. 3), Db 158db is stored together with the ID of Rx 110 obtained by Tx 102 at step 304. In a subsequent WPT operation, Tx 102 learns the ID of Rx 110 at step 204, and checks if memory 158 contains a DB 158db for this ID. If so, calibration is omitted, and the same DB 158db is used in the WPT operation. In other embodiments, calibration is performed, and the dPrx values obtained at step 330 for a dPtx value are combined (e.g. as weighted average) with the corresponding DB 158db value, and the resulting combined value is written to DB 158db as the new dPrx value.

In some embodiments, re-calibration is performed at later stages of the WPT operation, e.g. to account for changes in the state of load 112, e.g. the state of charge in the battery: as the battery is being charged, the battery charging requirements may change, and the system is re-calibrated by repeating the steps 320-330 to rebuild DB 158db.

Figure 4:
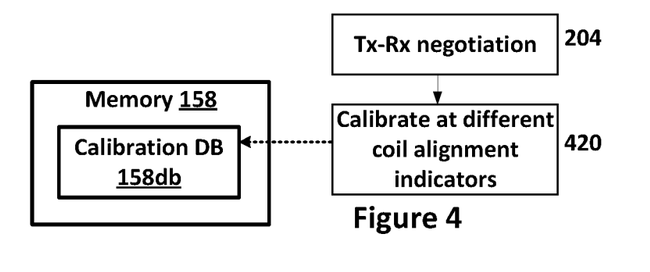
Figure 5:
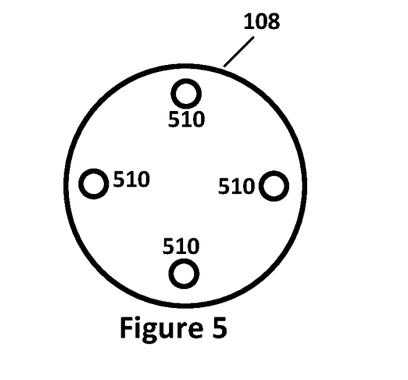
FIG. 5 illustrates sensing coils used for FOD.

In some embodiments (FIG. 4), calibration is performed before the WPT. Negotiation step 204 is performed as in FIG. 2A, then calibration step 420 is performed. In some embodiments, the WPT system is provided with a mechanism to determine coil alignment, and the calibration is performed at different coil alignment conditions. An example coil alignment detection mechanism uses sensing coils 510 (FIG. 5) positioned symmetrically with respect to Rx coil 108. Both in calibration and during subsequent WPT, the sensing coils 510 may be mounted inside Rx coil 108, or can be placed above or below the Rx coil 108, possibly above or below Tx 102. See U.S. Pat. No. 10,079,508, issued Sep. 18, 2018 to Mehas et al., and U.S. Pat. No. 10,132,650, issued Nov. 20, 2018 to Mehas et al., both incorporated herein by reference. If the Rx and Tx coils 108, 106 are perfectly aligned, the sensing coils 510 will have equal currents induced by the Tx magnetic field. If the Rx and Tx coils are misaligned, different sensing coils 510 will have different currents, which can be used to detect both the fact and the degree of misalignment.

For each coil alignment condition, calibration step 420 is like steps 320-340 of FIG. 3. At step 340, the calibration data dPtx, dPrx are written to DB 158db and are associated, in DB 158db, with coil alignment indication, e.g. with differential currents in sensing coils 510. Calibration is performed for multiple predefined alignment conditions. Calibration can be performed with any load 112 if the VOUT power depends linearly on the transmitted power in pulse 220 and the linear relationship is independent of the load or can be computed from a load parameter measured during WPT. In some embodiments, if the relationship is non-linear but can be approximate by different linear relationships in different regions of power Ptx or other parameters, calibration is performed in each of these regions, and calibration data for each region are associated with the region ID in DB 158db, for use in that region during WPT at step 240 of FIG. 2A. Also, calibration can be performed with different loads 112, and the dPrx values can be averaged over the loads. In some embodiments, 2 to 10 different loads (e.g. with different impedances) can be used.

In some embodiments, the calibration data (dPtx,dPrx) are approximated using a curve fitting technique, e.g. using a linear or exponential curve. The curve can depend on additional parameters in addition to dPtx, dPrx. The curve is recorded in DB 158db, and is used in FOD tests at step 240 to generate the expected dPrx value for values of dPtx and possibly other parameters.

In some embodiments, calibration is performed with different loads 112, but the calibration data are not averaged or combined for different loads. Rather, the calibration data for each load is associated with the load (e.g. some load parameter, such as impedance) in DB 158db. During charging, the load parameter is determined by Rx 110 and provided to Tx 102 at step 204 (FIG. 2A), and the associated calibration data are used in the FOD tests.

WPT proceeds as in FIGS. 2A, 2B. In addition, some time before the first occurrence of step 240, Tx 102 obtains coil alignment information, e.g. by receiving from Rx 110 the sensing coil currents. In FOD tests, Tx 102 uses the DB 158db entries recorded for the same (or similar) coil alignment condition. If a FO is present during WPT of FIG. 2A, the FO will be detected because no FO was present during the calibration step 420.

Instead of, or in addition to, the sensing coils, the alignment can be detected by measuring the coil coupling coefficient, e.g. by conventional, open-circuit measurement (load 112 disconnected) at the start of calibration and also immediately before WPT (at step 204 of FIG. 2A). Calibration is performed for different coil alignment (and misalignment) conditions, and the calibration data are associated in DB 158db with the respective coupling coefficient values for the alignment (or misalignment) conditions. The FOD tests use the calibration data associated with the same, or similar, coupling coefficient as measured at step 204 of FIG. 2A.

Instead of, or in addition to, the sensing coils and other techniques described above, the alignment can be detected by Q factor measurement, or a combination of the Q factor measurement and the coupling coefficient and/or sensing coil currents and/or some other techniques. Calibration is performed as in FIG. 4, except that the Q factor is used for coil alignment information instead of, or in addition to, other techniques. The Q factor can be measured by a frequency sweep or Rx or Tx coil losses as known in the art. During the WPT, at or before step 240, the Q factor can be detected and used to identify the pertinent calibration data in DB 158*db*. The corresponding calibration data can be a reliable indicator of FO presence.

The calibration data obtained at step 340 or 420 can also be stored by Rx 110 in its memory (not shown). Also during calibration, Rx 110 can measure and store such parameters as the output power at the VOUT terminal, rectified voltage Vrect, and operating frequency, and associate these parameters with the relative coil position (alignment or misalignment condition) provided to the Rx 110 by an operator or Tx 102, and also associate such parameters with the power change dPrx which the Rx 110 sends to Tx 102 in response to pulses 220 during calibration. Rx 110 can also associate all such data with the Tx 102 type. During charging (FIG. 2A), Rx 110 receives the Tx 102 type at step 204, and searches the Rx memory. If the Rx memory stores the calibration data for this Tx type, Rx 110 can measure the WPT values corresponding to the stored parameters and match the measured values against the stored parameters. If there is a mismatch, especially during and after a pulse 220, Rx 110 may issue an alarm to the user and/or Tx 102 regarding possible FOD.

An XY alignment coil placed on Tx and Rx can be used to measure the magnetic field strength on both sides of the wireless power air-core transformer and the change in the XY coil voltage can be used to increase accuracy of sensing methods further (stronger fields induce higher voltage in XY coils, this can be used to measure B-Field in a relative manner and identify if field is being blocked (absorbed by an FO or if the field is free and clear to reach the Rx coil without inference by an FO. See the aforementioned U.S. Pat. No. 10,079,508 and 10,132,650, incorporated herein by reference, and the aforementioned article by Yiming Zhang et al., *A review of foreign object detection (FOD) for inductive power transfer systems*, https://doi.org/10.1016/j.etran.2017.04.002, eTransportation (Elsevier B. V., 2019). section 3.3.

As noted above, some embodiments provide separate calibration data in DB 158*db* for each Rx 110 ID. In some embodiments, the same calibration data are used for multiple Rx 110 systems (multiple IDs) of the same type, e.g. the same model number or some other parameter defining the Rx 110 response to pulses 220. Calibration as in FIG. 3 or 4 may be performed only for a single Rx 110 of the type, or a few Rx units of that type (the calibration data can be averaged over multiple Rx units to form DB 158*db*), and the resulting DB 158*db* can be stored in non-volatile memory and used in WPT as in FIGS. 2A, 2B. For example, in some embodiments, at step 204 of FIG. 2A, Tx 102 learns the ID and/or type of Rx 110 and checks its memory 158 to determine if DB 158*db* is present for this ID or type. If so, calibration is omitted. If not, calibration is performed as in FIG. 3.

In some embodiments, DB 158*db* is created during Tx 102 manufacturing for an Rx type, and is associated with Rx 110 type in memory 158. Multiple DBs 158*db* may be so created for respective multiple Rx types. At step 204 of FIG. 2A, Tx 102 learns the ID and/or type of Rx 110 and checks to determine if DB 158*db* is present for this type. If so, calibration is omitted. If not, calibration is performed as in FIG. 3.

Many variations are possible. For example, in some embodiments, a pulse 220 is not terminated at step 220 but is continued until receipt of Rx report (step 230 in FIG. 2A). Other variations are possible.

The invention is not limited to the embodiments described above. Some aspects of the invention are defined by the following clauses:

Clause 1 defines a system comprising a wireless power transmitter comprising:

an input for receiving power (e.g. a VIN input, or an input connected to AC source 105);

a transmit coil;

a circuit for generating an AC power signal in the transmit coil from power received at the input, the circuit comprising:

a memory for storing modification data (e.g. DB 158*db*) which describe one or more modifications (e.g. dPtx) of the transmitter's operation to be performed while wirelessly transmitting power to a wireless power receiver, and for each modification, describe a corresponding responsive behavior (e.g. dPrx) of the receiver in the absence of foreign object (FO) interference;

a controller configured to operate the transmitter to perform one or more foreign object detection (FOD) tests to detect FO interference, each FOD test comprising:

operating the transmitter to perform at least one said modification, and determining if the receiver's responsive behavior matches the corresponding responsive behavior described by the modification data for the at least one said modification.

2. The system of clause 1, wherein the one or more FOD tests are performed without interrupting wireless transmission of power.

3. The system of clause 1 or 2, wherein the circuit is further configured to write the modification data to the memory.

4. The system of clause 3, wherein writing the modification data to the memory is performed during wireless transfer of power.

5. The system of clause 4, wherein writing the modification data to the memory comprises:

(a) operating the transmitter to perform a modification of wireless transfer of power;

(b) determining the receiver's behavior in response to the modification in (a);

(c) writing modification data to the memory, the modification data describing the modification in (a) and the receiver's behavior in (b).

6. The system of clause 3, wherein the circuit is configured to write the modification data to the memory when there is no wireless transfer of power.

7. The system of any preceding clause, wherein the modification data for each modification are referenced to a coil alignment condition, and said determining if the receiver's responsive behavior matches the corresponding responsive behavior described by the modification data is performed for the modification data referenced to a coil alignment condition determined as present in the WPT operation.

8. The system of any preceding clause, wherein at least one modification comprises modifying a power wirelessly transmitted by the transmitter.

9. The system of any preceding clause, wherein the receiver's responsive behavior is determined based on the receiver's request for a power amplitude level.

10. The system of any preceding clause, wherein each modification comprises a pulse of a power amplitude level, the pulse having a predefined duration.

11. A method for wireless power transfer (WPT) operation in which a wireless power transmitter transfers power to a wireless power receiver, the method comprising:

performing the WPT operation, wherein the WPT operation comprises inductively coupling the transmitter to the receiver and wirelessly transmitting power by the transmitter;

wherein the transmitter comprises a memory storing modification data which describe one or more modifications of the transmitter's operation to be performed while said wirelessly transmitting power, and for each modification, describe a corresponding responsive behavior of the receiver in the absence of foreign object (FO) interference; and the method comprises performing one or more foreign object detection (FOD) tests to detect FO interference, each FOD test comprising:

operating the transmitter to perform at least one said modification, and determining if the receiver's responsive behavior matches the corresponding responsive behavior described by the modification data for the at least one said modification.

12. The method of clause 11, further comprising:

if the corresponding receiver's responsive behavior matches the responsive behavior described by the modification data, then operating the transmitter without signaling FO presence;

if the receiver's responsive behavior does not match the responsive behavior described by the modification data, then signaling FO presence by the transmitter.

13. The method of clause 11 or 12, wherein the one or more FOD tests are performed without interrupting wireless transmission of power.

14. The method of any one or more of clauses 11 through 13, further comprising writing the modification data to the memory.

15. The method of clause 14, wherein writing the modification data to the memory is performed during the WPT operation.

16. The method of clause 15, wherein writing the modification data to the memory comprises:

(a) operating the transmitter to perform a modification of the WPT operation;

(b) determining the receiver's behavior in response to the modification in (a);

(c) writing modification data to the memory, the modification data describing the modification in (a) and the receiver's behavior in (b).

17. The method of clause 14, wherein writing the modification data to the memory is performed before the WPT operation.

18. The method of any one or more of clauses 11 through 17, wherein the modification data for each modification are referenced to a coil alignment condition, and said determining if the receiver's responsive behavior matches the corresponding responsive behavior described by the modification data is performed for the modification data referenced to a coil alignment condition determined as present in the WPT operation.

19. The method of any one or more of clauses 11 through 18, wherein at least one modification comprises modifying a power wirelessly transmitted by the transmitter.

20. The method of any one or more of clauses 11 through 19, wherein the receiver's responsive behavior is determined based on the receiver's request for a power amplitude level.

The invention also includes a controller configured to perform the methods described herein and/or to be part of a transmitter described herein.

The above detailed description is provided to illustrate specific embodiments of the present invention and is not intended to be limiting. Numerous variations and modifications within the scope of the present invention are possible. The present invention is set forth in the following claims.

What is claimed is:

1. A system comprising a wireless power transmitter for performing a wireless power transfer (WPT) operation, the system comprising:

an input for receiving power;

a transmit coil;

a circuit configured to generate an AC power signal in the transmit coil from power received at the input in order to perform WPT from the transmitter to a wireless power receiver in the WPT operation, the circuit comprising a controller configured to operate the transmitter to:

(A) perform normal operation in which the transmitter generates the AC power signal to transmit power to the wireless power receiver, wherein in normal operation:

the transmitter receives feedback messages from the wireless power receiver; and the transmitter adjusts the AC power signal in correspondence with the feedback messages;

(B) interrupt the normal operation to perform one or more foreign object detection (FOD) tests to detect FO interference, wherein each FOD test comprises a first operation, a second operation, and a third operation, and in each FOD test:

in the first operation, the transmitter changes the AC power signal not to correspond to the feedback messages; then in the second operation, the transmitter receives one or more new feedback messages from the wireless power receiver; and in the third operation, the transmitter determines whether or not the one or more new feedback messages match the AC power signal change in the first operation to indicate presence or absence of a foreign object.

2. The system of claim 1, wherein:

the circuit comprises a memory for storing modification data which describe, for each FOD test:

(i) the AC power signal change for the first operation; and (ii) a corresponding expected new feedback message for the second operation in the absence of a foreign object;

wherein, during the FOD test:

in the first operation, the transmitter changes the AC power signal in accordance with memory description (i); and in the third operation, the transmitter determines whether or not the one or more new feedback messages received in the second operation match memory description (ii).

3. The system of claim 2, wherein the first operation comprises the transmitter generating a pulse of the AC power signal, the modification data comprising a width of the pulse and an amplitude of the pulse.

4. The system of claim 2, wherein:

the circuit is further configured to write memory descriptions (i) and (ii) to the memory during wireless transfer of power.

5. The system of claim 4, wherein writing the memory descriptions (i) and (ii) to the memory comprises determining one or more AC power signal changes for (i), and for each determined AC power signal change for (i) performing, in the absence of a FO, operations of:

(a) operating the transmitter to perform the determined AC power signal change for (i) in the absence of a FO;

(b) receiving by the transmitter one or more feedback messages from the wireless power receiver in response to (a); and (c) writing to the memory, the modification data describing the AC power signal change determined in (a) and the corresponding one or more feedback messages received in (b).

6. The system of claim 2, wherein the circuit is configured to write the modification data to the memory when there is no wireless transfer of power.

7. The system of claim 2, wherein the memory description (ii) describes a plurality of expected new feedback messages each of which is referenced in the memory to a coil alignment condition, wherein the circuit is configured to determine a coil alignment condition present in the WPT operation, and the third operation is performed using the expected new feedback message referenced to the coil alignment condition determined as present in the WPT operation.

8. The system of claim 1, wherein the first operation comprises modifying a rms power wirelessly transmitted by the transmitter.

9. A system comprising a wireless power transmitter configured to generate an AC power signal to transmit power to a wireless power receiver, the transmitter being configured to receive, from the wireless power receiver, feedback messages regarding the AC power signal, the system comprising:
an input for receiving power;
a transmit coil;
a circuit for generating the AC power signal in the transmit coil from power received at the input, the circuit comprising:
a memory for storing modification data which describe one or more modifications of the transmitter's operation to be performed in one or more foreign object detection (FOD) tests, wherein in each FOD test the transmitter performs a modification to increase or decrease transmitted power in accordance with the modification data non-responsively to the feedback messages received by the transmitter from the wireless power receiver while wirelessly transmitting power to the wireless power receiver, wherein for each modification, the modification data further describe an expected subsequent behavior of the wireless power receiver in response to the modification performed by the transmitter in the absence of foreign object (FO) interference;
a controller configured to operate the transmitter to:
receive the feedback messages from the wireless power receiver;
generate the AC power signal outside of the FOD tests responsively to the feedback messages received by the transmitter from the wireless power receiver;
perform the one or more foreign object detection (FOD) tests to detect FO interference, each FOD test comprising:
operating the transmitter to perform at least one said modification non-responsively to the feedback messages from the wireless power receiver in accordance with the modification data stored in the memory, and determining if the wireless power receiver's subsequent behavior matches the expected subsequent behavior described by the modification data for the at least one said modification.

10. The system of claim 9, wherein for each modification, the modification data comprises a pair of values <dPtx, dPrx>, wherein:

dPtx is a relative increase or decrease of transmitted power for the modification; and
dPrx is an expected subsequent relative change of power requested by the wireless power receiver in response to the transmitter changing the transmitted power by dPtx.

11. A method for performing a wireless power transfer (WPT) operation in which a wireless power transmitter transmits power to a wireless power receiver, the method comprising:
(A) generating, by the transmitter, an AC power signal transmitting power to the wireless power receiver, wherein:
the transmitter receives requests from the wireless power receiver regarding the AC power signal; and
the transmitter adjusts the AC power signal based on the requests;
(B) performing one or more foreign object detection (FOD) tests to detect FO interference, wherein each FOD test comprises a first operation, a second operation, and a third operation, and in each FOD test:
in the first operation the transmitter changes the AC power signal to differ from the requests; then
in the second operation, the transmitter receives one or more new requests from the wireless power receiver; and
in the third operation, the transmitter determines whether or not the one or more new requests match the AC power signal change in the first operation to indicate presence or absence of a foreign object.

12. The method of claim 11, further comprising storing, in a memory of the transmitter, a description of the AC power signal change for the first operation, and storing in the memory a description of a corresponding expected new request for the second operation if no foreign object is present;
wherein the third operation comprises matching the expected stored new request with the new request received in the second operation during the WPT operation.

13. The method of claim 12, wherein the first operation comprises the transmitter generating a pulse of the AC power signal, the memory storing a width of the pulse and an amplitude of the pulse.

14. The method of claim 12, wherein storing, in the memory, the description of the AC power signal change for the first operation and of the corresponding expected new request for the second operation if no foreign object is present, is performed by writing to the memory during the WPT operation.

15. The method of claim 14, wherein the writing to the memory comprises determining the AC power signal change for the first operation, and performing, in the absence of a FO, operations of:
(a) operating the transmitter to perform the determined AC power signal change for the first operation;
(b) receiving by the transmitter one or more requests from the wireless power receiver in response to (a); and
(c) writing, to the memory, a description of the determined AC power signal change in (a) and the one or more requests in (b).

16. The method of claim 12, wherein the storing in the memory is performed before the WPT operation.

17. The method of claim 12, wherein the memory stores descriptions of a plurality of expected AC power signal changes each of which is referenced in the memory to a coil alignment condition, and the third operation uses the expected AC power signal change referenced to a coil alignment condition determined as present in the WPT operation.

18. The method of claim 12, wherein:
   each of memory descriptions (i) and (ii) is stored in the memory as a relative change of power.

19. The method of claim 12, wherein each of the requests comprises a request for a current or power amplitude level.

20. The method of claim 11, further comprising:
   if the expected stored new request matches the new request received in the second operation during the WPT operation, then operating the transmitter without signaling FO presence;
   if the expected stored new request does not match the new request received in the second operation during the WPT operation, then signaling FO presence by the transmitter.

\* \* \* \* \*